Sept. 7, 1948.　　　G. P. SILBERSTEIN　　　2,448,920
COLLAPSIBLE VIEW FINDER
Filed June 8, 1946
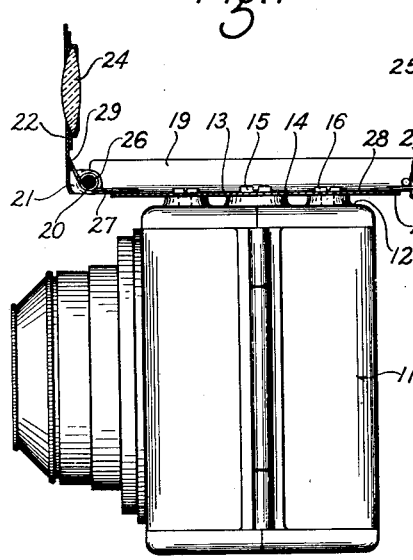
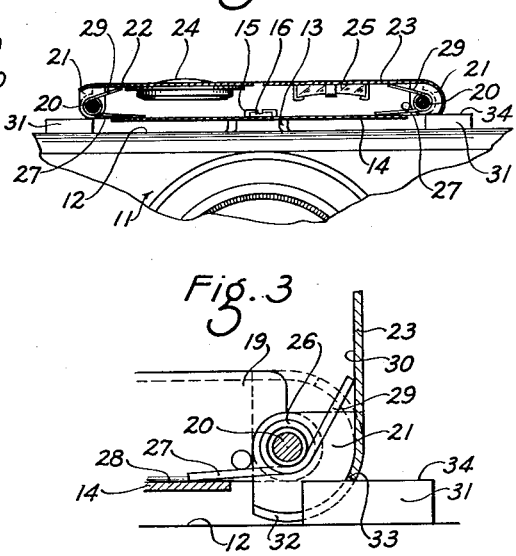
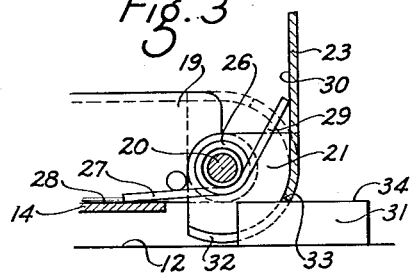
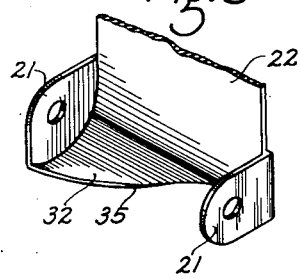
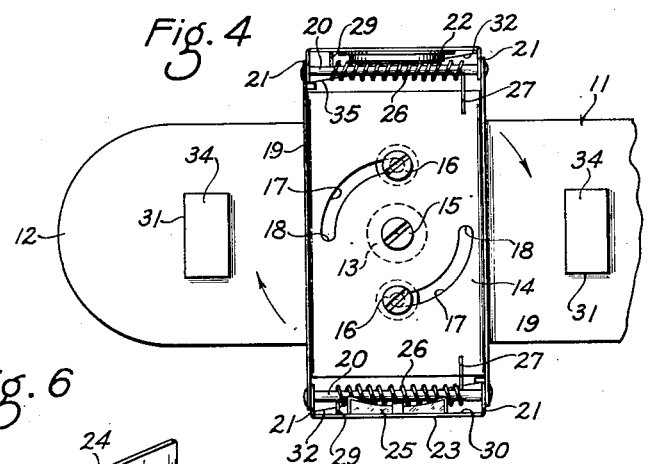
George P. Silberstein
INVENTOR
BY
ATTORNEYS Patented Sept. 7, 1948

2,448,920

UNITED STATES PATENT OFFICE 2,448,920

COLLAPSIBLE VIEW FINDER

George P. Silberstein, Rochester, N. Y., assignor to Eastman Kodak Company, Rochester, N. Y., a corporation of New Jersey Application June 8, 1946, Serial No. 675,409

10 Claims. (Cl. 33—64)

1

The present invention relates to photography, and more particularly to a view finder for use on a camera.

The principal object of the invention is the provision of a view finder, the parts of which are automatically movable to an operative position when the finder is ready for use, but when the finder is moved to an inoperative position, the parts are automatically collapsed or folded.

Still another object of the invention is the provision of a finder in which movement of the parts to an inoperative or collapsed position is automatic upon positioning the finder.

Yet another object of the invention is the provision of a view finder of the class described which is sturdy, easy and automatic in its operation, and highly effective in use.

To these and other ends, the invention resides with certain improvements and combinations of parts, all that will hereinafter be more fully described, the novel features being pointed out in the claims at the end of the specification.

In the drawings:

Fig. 1 is a side view of a camera, showing a view finder constructed in accordance with one embodiment of the invention arranged in operative position and ready for use;

Fig. 2 is a partial front view of the camera and finder shown in Fig. 1, showing the relation of the finder parts when in the collapsed or inoperative position;

Fig. 3 is a vertical sectional view through one of the finder elements of the view finder of Fig. 1 and Fig. 2, but on a larger scale than the latter, showing the arrangement of the lugs on the camera body and the cam on the finder elements for moving the latter to a collapsed position;

Fig. 4 is a plan view of the view finder of Fig. 1 and Fig. 2 arranged in an operative position;

Fig. 5 is a partial perspective view of one of the finder elements, showing the relation of the collapsing cam thereon; and Fig. 6 is a perspective view of another modification of a collapsible view finder.

Similar reference numerals throughout the various views indicate the same parts.

The present invention relates to a view finder adapted for use in connection with a photographic camera. The finder comprises, in general, a base plate which is swingably or pivotally mounted at its midpoint on the top of the camera so that it may be selectively swung to an operative position substantially parallel to or in alignment with the optical axis of the camera, as shown in Figs. 1 and 4, and 6, or to an inoperative position

2 substantially normal to said axis, as shown in Fig. 2. When the base plate is swung to an operative position, the finder elements are automatically moved about their hinges or pivot points so as to extend upwardly from the base plate and in substantially parallel relation, as shown in Figs. 1, 4 and 6. However, when the base plate is swung to its inoperative position, the finder elements are automatically folded down or collapsed, as shown in Fig. 2.

Figs. 1 to 4 relate to one embodiment of the invention, which shows a camera body 11, the top 12 of which is provided with a boss 13 on which is pivotally or swingably mounted the rectangular base plate 14 of the view finder of the present invention. A screw 15 extends through a registering opening in the plate 14 and into a threaded opening in the stud 13 to secure the base plate 14 to the camera top. Studs 16 secured to the top 12 extend upwardly through arcuate slots 17 of the plate 14 and cooperate with the ends 18 of the slots to limit the swinging movement of the plate 14 on the camera top 12, as is apparent from an inspection of Fig. 4. The plate 14 is provided with side rails 19, the ends of which are arranged to receive pintles or shafts 20 which extend through spaced ears 21 formed on the lower ends of the front and rear finder elements 22 and 23, respectively, as best shown in Fig. 4. The elements 22 and 23 are provided with appropriate lenses 24 and 25 which are arranged in optical alignment, as is well known. A coil spring 26 is wrapped around each of the pintles 20 and has one end 27 lying against the upper face 28 of the base plate 14, and the other end 29 engaging the inner face 30 of the adjacent finder element.

By means of this arrangement, when the base plate 14 is swung from its inoperative position normal to the optical axis, as shown in Fig. 2, to the operative position in alignment with the optical axis, as shown in Figs. 1 and 4, the springs 26 serve to automatically move or pivot the finder elements 22 and 23 about their hinges or pintles 20 to an erected or operative position, as illustrated in Figs. 1 and 4. In this operative position, the finder elements extend vertically upward from the base plate 14 and are substantially in parallel relation and with the lenses 24 and 25 in optical alignment, as is apparent from an inspection of the drawing. When, however, the base plate 14 is again swung to its inoperative position normal to the optical axis, as shown in Fig. 2, it is desirable to move the elements 22 and 23 from their erected or operative position shown in Fig. 1 and Fig. 4 to a collapsed or folded position as shown in Fig. 2.

To secure this result, the top 12 of the camera is provided, in the preferred arrangement, with a pair of fixed upstanding members or lugs 31 positioned on opposite sides of the boss 13, as best shown in Figs. 2 and 4. Each finder element 22 and 23 has the lower portion thereof below the pintle 20, bent to form a cam 32 of the shape best shown in Figs. 3 and 5. This cam is spiral in form and gradually moves about the axis of the pintle 20 as it extends axially thereon, as best shown in Figs. 3, 4 and 5. These cams 32 are positioned to engage the lugs 31 as the plate 14 is swung in a clockwise direction about the boss 13, as indicated by the arrows in Fig. 4. Such movement first causes the leading edge 33 of each cam 32 to engage the top surface 34 of the cooperating lug 31. Further rotative movement of the plate 14 then causes the cam face 35 of the cam 32 to slide along the surface 34. Due to the spiral shape of the cam, the sliding of the face 35 on the surface 34 causes the finder element to progressively and gradually move or pivot about the pintle 20 from the erected position, as shown in Figs. 1 and 4, to the collapsed position, as shown in Fig. 2. Thus the mere movement of the plate 14 in a clockwise direction, as viewed in Fig. 4, serves to automatically move the finder elements 22 and 23 to their inoperative or collapsed position.

In the embodiment illustrated in Figs. 1 and 4, the spring 26 serves to automatically move the finder elements 22 and 23 to their erected position when the base plate 14 is moved in a clockwise direction, as viewed in Fig. 4, to bring the plate 14 to its operative position and in alignment with the optical axis of the camera. When, however, the plate 14 is swung in a clockwise direction, as viewed in Fig. 4, the lugs 31 and cams 32 cooperate to fold or collapse the finder elements 22 and 23 against the action of the springs 26. Thus the mere movement of the plate 14 serves to move the finder elements to the proper position.

Fig. 6 shows a modified arrangement in which the base plate 14 is swingably mounted on a boss 41 extending upwardly from the top 12 of the camera body. This boss 41 is the shape shown for reasons to be later described. The side rails 42 of the base plate are provided with inwardly extending bearings 43 adapted to receive the pintles 44 of the front and rear finder elements 45 and 46, respectively. A coil spring 47 is wrapped around each pintle 44 and has one end 48 thereof engaging the top face 28 of the plate 14 while the other end 49 of the spring contacts the outer surface 50 of the adjacent finder element. With this arrangement, the coil springs 47 serve to move the finder elements downwardly about their pivot or hinges to collapse the elements. This arrangement is thus the reverse of that employed in the finder construction illustrated in Figs. 1 to 5 and above described.

In order to erect the finder elements 45 and 46, the arrangement shown in Fig. 6 is provided with a tensioning member 51 in the form of a wire which extends below the plate 14 and has the ends 52 thereof passed around and below the pintles 44 and secured to the outer surfaces 50 of the elements in any suitable and well-known manner such, as for example, by screws 53. When the plate 14 is arranged normal to the optical axis, the springs 47 retain the finder elements 44 and 45 in a collapsed or folded position, and the tension wire 55 is loose or slack. When, however, the plate 14 is swung to its operative position, as shown in Fig. 6, the portion of the wire 51 positioned below the plate 14 engages a pointed or cam portion 54 of the boss 41. Such engagement serves to tighten or take up the slack in the wire 51 as clearly illustrated in Fig. 6. As the wire 51 is thus tightened, it exerts an outward pull on the screws 53 to move or pivot the elements about the pintles 44 to erect the elements to the position shown in Fig. 6. Thus the movement of the plate 14 to its operative position serves automatically to move the finder elements to their erected or operative position.

It will thus be apparent from the above description that the present invention provides a view finder construction in which the finder elements are automatically moved to their operative position when the base plate is positioned for use. When, however, the base plate is swung to its inoperative position, the finder elements are automatically folded or collapsed.

While certain embodiments of the invention have been disclosed, it is to be understood that the inventive idea may be carried out in a number of ways. This application is, therefore, not to be limited to the precise details disclosed, but is intended to cover all variations and modifications thereof, falling within the scope of the appended claims.

I claim:

1. In a photographic device, the combination with a camera body, of a view finder comprising a base plate swingably mounted on said body, finder elements hingedly connected to the opposite ends of said base plate, said elements being movable to an erected position so as to extend upwardly from said base plate and in parallel relation when said plate is arranged substantially parallel with the optical axis of the camera, said elements also being movable to a collapsed position when the base plate is arranged normal to said axis, and means including a member on said body and cooperating with said elements to move the latter to one of said positions when said plate is swung on said body.

2. In a photographic device, the combination with a camera body, of a view finder comprising a base plate swingably mounted on said body, finder elements hingedly connected to the opposite ends of said base plate, said elements being movable to an erected position so as to extend upwardly from said base plate and in parallel relation when said plate is arranged substantially parallel with the optical axis of the camera, said elements also being movable to a collapsed position when the base plate is arranged normal to said axis, spring means for automatically moving said elements to one of said positions when the plate is swung in one direction on said body, and means including a member on said body and cooperating with said elements to move the latter to the other of said positions when said plate is swung in another direction on said body.

3. In a photographic device, the combination with a camera body, of a view finder comprising a flat base plate swingably mounted at its midpoint on said body, finder elements hingedly connected to the opposite ends of said plate, said elements being movable relative to said plate to an erected position so as to extend upwardly from said base plate and in parallel relation when said plate is arranged substantially parallel with the optical axis of the camera, said elements also being movable to a flat collapsed position when the base plate is arranged normal to said axis, coil springs arranged around the hinge connections of said elements for moving said elements to one of said positions when the plate is swung in one direction on said body, and means including a fixed member on said body and cooperating with said elements to move the latter to the other of said positions when said plate is swung in another direction on said body.

4. In a photographic device, the combination with a camera body, of a view finder comprising a base plate, a stud on said body on which said base plate is mounted so that it may be swung from a position substantially parallel with the optical axis of said camera to a position normal thereto, finder elements hingedly mounted to the opposite ends of said plate, spring means for automatically moving said elements in erected relation when said plate is swung to said first position, and means on said body adapted to engage said elements to move the latter to a collapsed position when said plate is swung to said normal position.

5. In a photographic device, the combination with a camera body, of a view finder comprising a base plate, a stud on said body on which said base plate is mounted so that it may be swung from a position substantially parallel with the optical axis of said camera to a position normal thereto, finder elements hingedly mounted to the opposite ends of said plate, spring means for automatically moving said elements in erected relation when said plate is swung to said first position, lugs carried by said body adjacent said plate, and a cam formed on each of said elements and adapted to engage one of said lugs when said plate is moved to said normal position, said lugs and cams cooperating to move said elements about their hinges when said plate is being swung to said normal position to move said elements to a collapsed position.

6. In a photographic device, the combination with a camera body, of a view finder comprising a base plate, means for pivotally mounting said plate on said body for movement to and from a position substantially parallel with the optical axis of the camera, finder elements hingedly mounted to the opposite ends of said plate, coil springs associated with elements for moving the latter into erected arrangement, lugs carried by said body and projecting upwardly therefrom adjacent said plate, and a cam formed on each of said elements below the hinge point thereof, each of said cams being adapted to engage one of said lugs when said plate is swung from said position to gradually turn said elements about said hinges to move the elements into a collapsed arrangement.

7. In a photographic device, the combination with a camera body, of a view finder comprising a base plate, a stud formed on the top of said body and connected to said plate to pivotally mount the latter on said top for selective swinging movement to a position substantially parallel with the optical axis of the camera or to a position normal to said axis, finder elements hingedly mounted to the opposite ends of said plate, coil springs associated with said hinges for automatically positioning said elements in erected arrangement when said plate is swung into said first position, a pair of fixed lugs arranged on said top and extending upwardly therefrom and positioned on opposite sides of said swingable plate, and a spiral cam formed on each of said elements below the hinge connection thereof, said cams being adapted to engage said lugs when said plate is swung to said normal position to progressively move said elements about their hinges to a collapsed position.

8. In a photographic device, the combination with a camera body, of a view finder comprising a base plate, a stud on said body on which said base plate is pivotally mounted so that it may swing to and from a position substantially parallel with the optical axis of the camera, finder elements hingedly connected to the opposite ends of said base plate, spring means for automatically moving said elements to a collapsed position when said base plate is moved from said position, a tension member carried by said finder and connected to said elements, and a member on said body adapted to tension said member when said plate is moved to said position to move said elements to erected position.

9. In a photographic device, the combination with a camera body, of a view finder comprising a base plate, a stud on said body on which said base plate is pivotally mounted so that it may swing to and from a position substantially parallel with the optical axis of the camera, finder elements hingedly connected to the opposite ends of said base plate, spring means for automatically moving said elements to a collapsed position when said base plate is moved from said position, a wire extending below said plate and having the opposite ends connected to said elements above said hinges, and a cam carried by said body adjacent said stud adapted to engage and tension said wire when said plate is moved to said position to rotate said elements about their hinges and into erected relation.

10. In a photographic device, the combination with a camera body, of a view finder comprising a base plate, a stud on said body on which said base plate is pivotally mounted so that it may swing to and from a position substantially parallel with the optical axis of the camera, finder elements hingedly connected to the opposite ends of said base plate, spring means for automatically moving said elements to a collapsed position when said base plate is moved from said position, a wire extending below said plate and having the opposite ends extending around said hinges and connected to said elements above said hinges, said wire being slack when said plate is swung from said position so as to enable the springs to collapse said elements, and a stationary cam on said body adjacent said stud adapted to engage said wire when the plate is swung to said position to tighten the wire to cause the latter to pull said elements about their hinges and into erected relation.

GEORGE P. SILBERSTEIN.